(12) United States Patent
Walker et al.

(10) Patent No.: US 6,643,081 B1
(45) Date of Patent: Nov. 4, 2003

(54) THERMALLY COMPENSATED DATA HANDLING SYSTEM USING APERIODIC TEMPERATURE READINGS

(75) Inventors: Timothy Ted Walker, Edmond, OK (US); Shawn Alan Wakefield, Norman, OK (US); Daniel Thomas Kiser, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/641,696

(22) Filed: Aug. 18, 2000

Related U.S. Application Data

(60) Provisional application No. 60/150,141, filed on Aug. 20, 1999.

(51) Int. Cl.[7] .............................................. G11B 27/36
(52) U.S. Cl. ............................ 360/31; 360/60; 360/46; 360/53; 360/66
(58) Field of Search .............................. 360/31, 25, 60, 360/67, 46, 97.02, 53, 68, 66, 69; 714/774, 704, 721, 769, 770; 324/685, 760, 224, 226, 212, 210; 702/130

(56) References Cited

U.S. PATENT DOCUMENTS

| | | |
|---|---|---|
| 5,005,089 A | 4/1991 | Thanos et al. |
| 5,084,791 A | 1/1992 | Thanos et al. |
| 5,721,816 A | 2/1998 | Kusbel et al. |
| 5,923,485 A * | 7/1999 | Ito .............................. 360/31 |

* cited by examiner

Primary Examiner—Alan T Faber
(74) Attorney, Agent, or Firm—Kirk A. Cesari

(57) ABSTRACT

The present invention uses temperature readings obtained aperiodically, on demand. Rather than merely obtaining temperature readings on each expiration of a fixed timer, operating parameters are updated in response to a fault detected in the data path. Data handling systems of the present invention each include at least one data path having a thermal range within which it operates best. Applicant notes that some "key" operating parameters typically have a substantial effect on this thermal range. Temperature sensors positioned near the transducers provide a temperature reading to control circuits, which update "key" operating parameter values in response to indications of faults in a primary data path. This reduces the need for more frequent temperature monitoring and calculation-intensive recalibration.

18 Claims, 4 Drawing Sheets

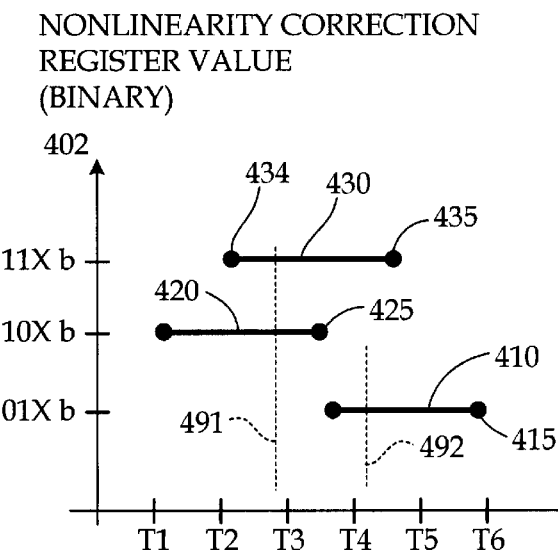
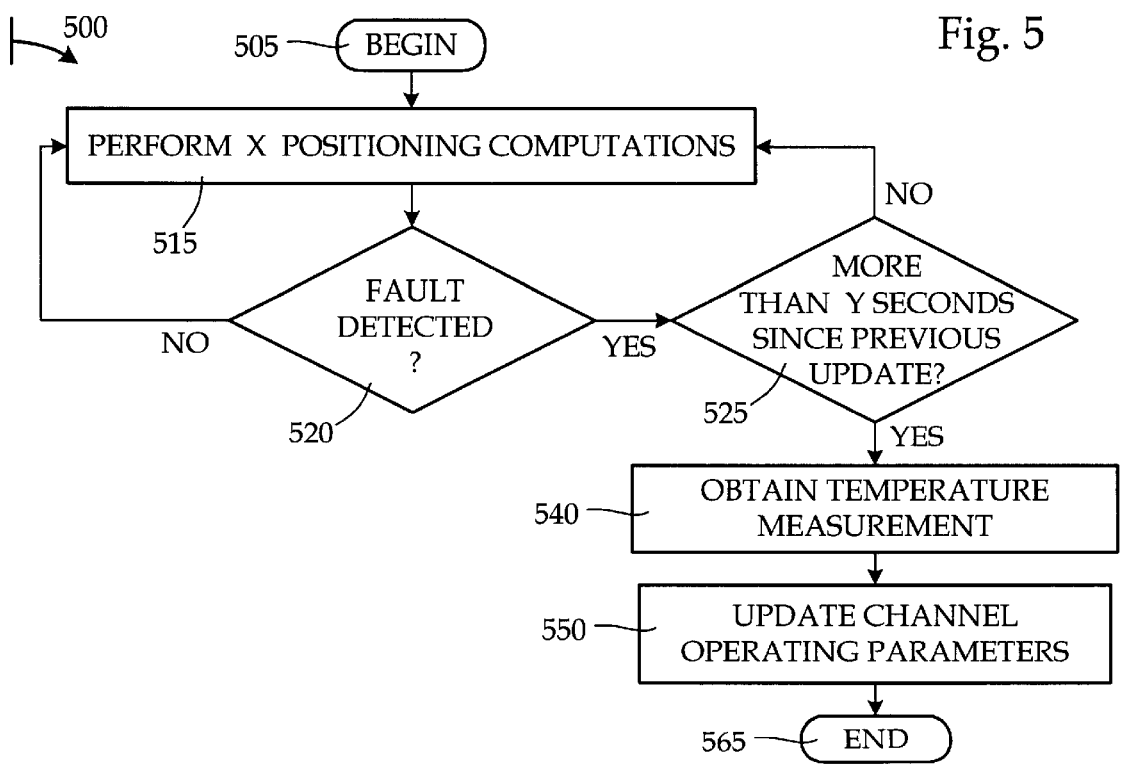

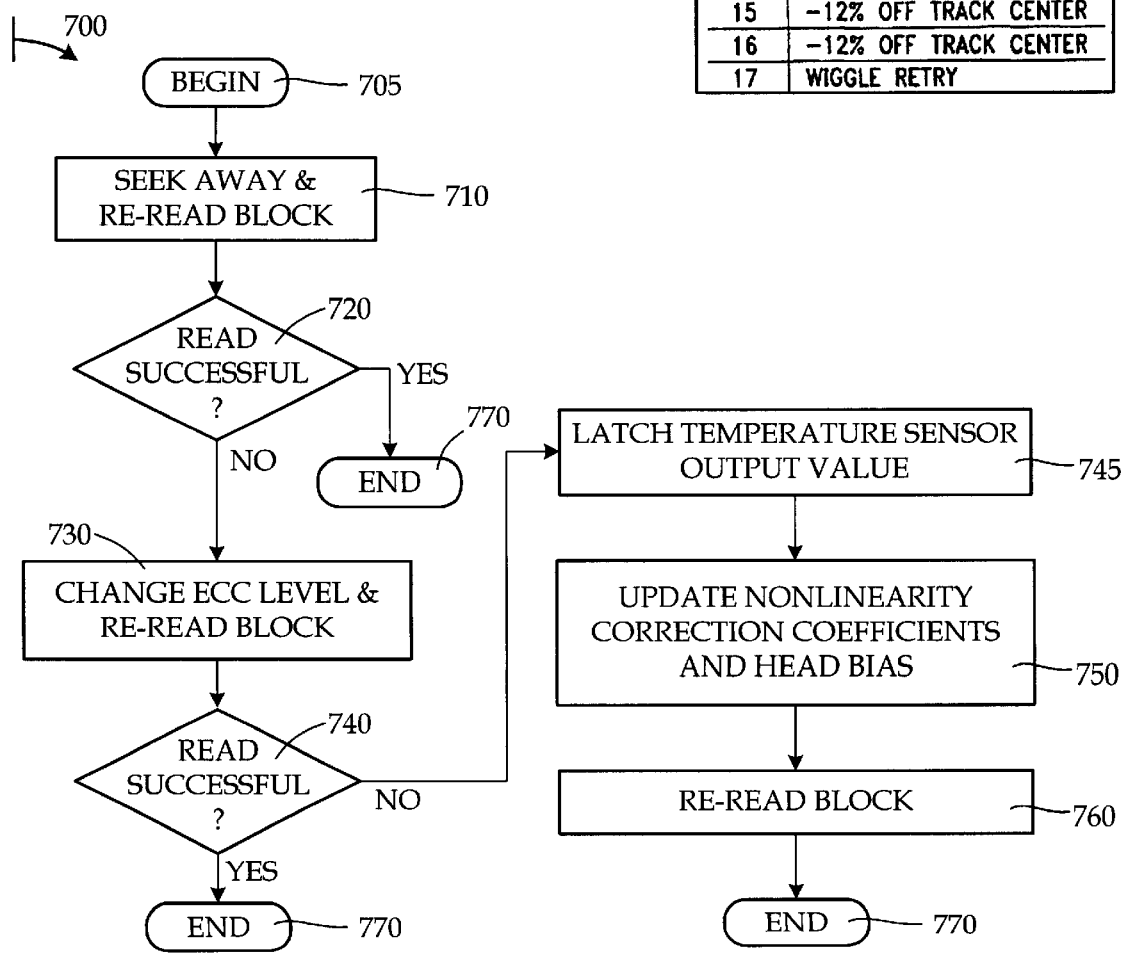

THERMALLY COMPENSATED DATA HANDLING SYSTEM USING APERIODIC TEMPERATURE READINGS

RELATED APPLICATIONS

This application claims the benefit of U.S. Provisional Application No. 60/150,141 filed on Aug. 20,1999.

FIELD OF THE INVENTION

The present invention relates generally to improvements in the operation of data channels, and more particularly to calibrating data channels more effectively to compensate for thermal fluctuations in transducers such as read/write heads.

BACKGROUND OF THE INVENTION

High performance data handling systems frequently make use of delicate transducers. In many wireless communications, for example, antennas and sensors must be exposed directly to the air. This can cause temperature fluctuations that will disrupt their calibration and can degrade or even prevent their performance.

Modern disc drives position transducers adjacent to a spinning disc, the close positioning required for reading the weak signals received from the closely spaced tracks. Disc drives are the primary devices employed for mass storage of computer programs and data. The advantages of disc drive technology over other means of data storage include a lower cost per unit of storage capacity and a generally higher transfer rate.

In a typical "Winchester" magnetic disc drive, digital data is written to and read from a thin layer of magnetized material on a surface of one or more discs. A load beam supports a hydrodynamic air bearing slider close to each data surface of a rotating magnetic disc. The load beam supplies a downward force that counteracts the hydrodynamic lifting force developed by the slider's air bearing. The slider carries a magnetic transducer for communication with individual bit positions on the rotating magnetic disc. Even a small thermal variation resulting from ambient temperature shifts can disrupt the magnetic properties and physical positioning of a transducer head. Also, moving disc surfaces contact the tiny disc drive heads, frequently causing localized temperature changes in their sensitive read or write transducers.

Disc drives including thermal calibration have existed for several years. For example, U.S. Pat. No. 5,005,089 entitled "HIGH PERFORMANCE, HIGH CAPACITY MICRO-WINCHESTER DISK DRIVE" issued Apr. 2, 1991 to Thanos et al. discloses a disc drive with a temperature sensor that is periodically checked to facilitate recalibration. Unfortunately, systems relying on periodic calibration have inherent weaknesses. Such systems respond poorly to thermal changes that occur soon after a calibration, for example. In a typical system, thermal calibration is performed every ten minutes. Reducing this interval would improve performance, but is somewhat impractical because of the processing demands it would impose.

A need therefore exists in the art for data handling systems with a more responsive thermal calibration. It is desirable that this be achieved, moreover, without a substantial increase in processing overhead. The present invention solves these problems and offers other advantages over the prior art.

SUMMARY OF THE INVENTION

The present invention differs from prior systems because it obtains and uses temperature readings aperiodically, on demand. Rather than merely obtaining temperature readings on each expiration of a fixed timer, systems of the present invention update one or more operating parameters in response to a fault detected in the data path. Data handling systems of the present invention each include at least one data path having a thermal range within which it operates best. Applicant notes that some "key" operating parameters typically have a substantial effect on this thermal range. (As used herein, a "substantial" effect on a range is one that can potentially cause a shift of at least 10° C. in either the maximum or the minimum of the range.) Temperature sensors positioned near the transducers provide a temperature reading to control circuits, which update "key" operating parameter values in response to indications of faults in a primary data path.

Systems of the present invention respond to temperature shifts, reducing the need for more frequent temperature monitoring and calculation-intensive recalibration. Other features and advantages of various embodiments will become apparent upon a review of the following figures and the accompanying explanations.

BRIEF DESCRIPTION OF THE DRAWINGS

FIG. 4 plots the allowed values of another binary register against temperature.

FIG. 5 depicts a calibration method of the present invention.

FIG. 6 depicts a read error recovery table known in the disc drive industry.

FIG. 7 depicts a method of the present invention particularly suited to read error recovery in a disc drive.

DETAILED DESCRIPTION

Numerous aspects of data handling and thermal calibration that are not a part of the present invention, or are well known, are omitted for brevity. These include (1) deciding what kind of transducer is best suited to a particular application; (2) defining what range of temperatures a given system should accommodate; and (3) deciding exact formulae to be used for updating key operating parameters. Although each of the examples below shows more than enough detail to allow those skilled in the art to practice the present invention, subject matter regarded as the invention is broader than any single example below. The scope of the present invention is distinctly defined, however, in the claims at the end of this document.

Figure 1:
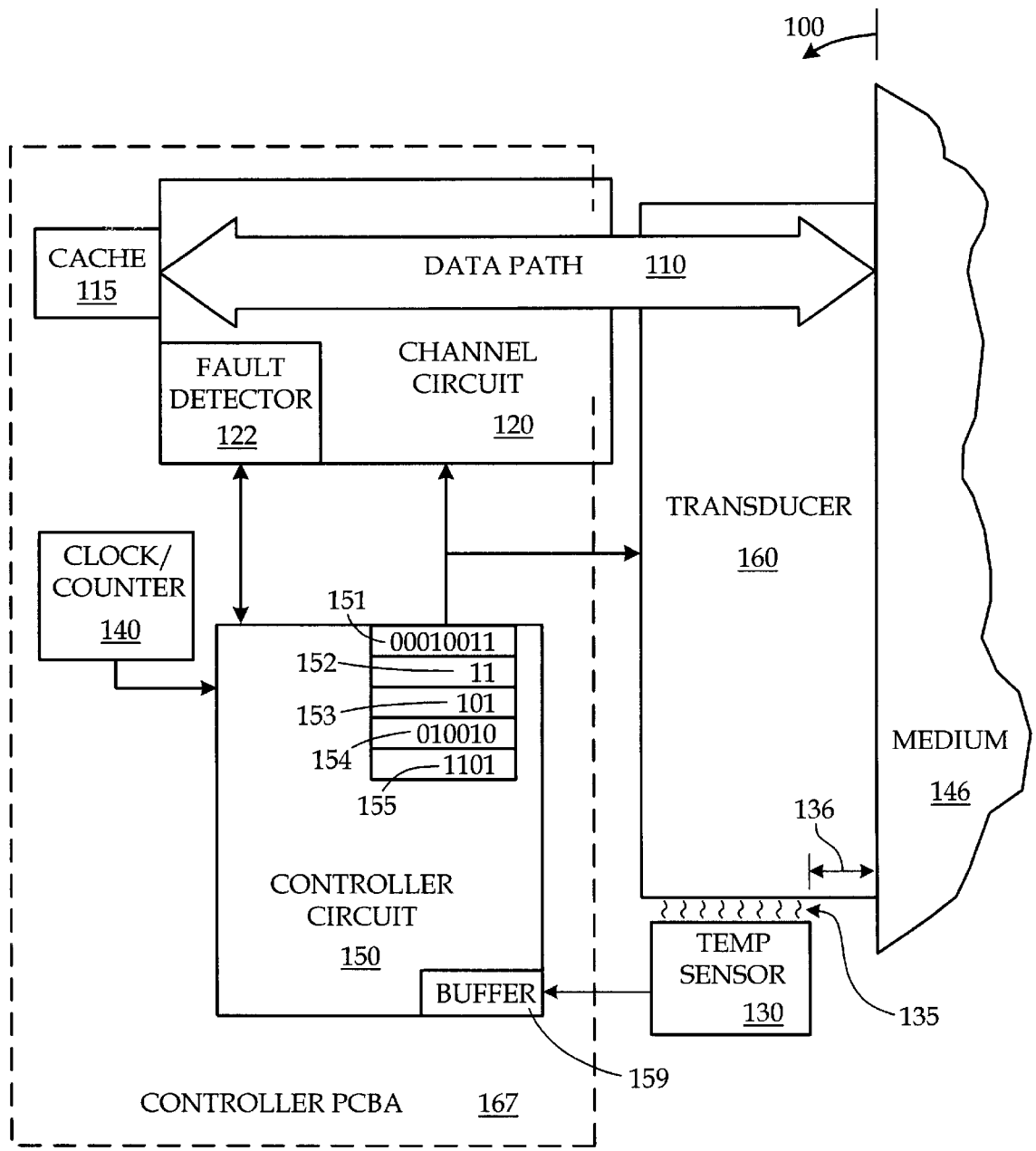
FIG. 1 shows a schematic diagram of a data handling system of the present invention.

FIG. 1 shows a schematic diagram of a data handling system 100 of the present invention. Data flows through a data path 110 between a medium 146 and a cache 115. The transducer 160 may be an antenna able to send and receive data through a medium 146 such as air. Alternatively, the transducer 160 may be a read/write head configured to read data from a medium 146 such as a moving data storage disc or tape. In any event, the necessity of the present invention arises because the performance of transducer 160 depends upon its temperature and whether its operating parameters are adequately calibrated to that temperature. For this reason, a temperature sensor 130 is positioned near enough to transducer 160 so that sensor 130 effectively measures the temperature of transducer 160. Gap 135 between transducer 160 and sensor 130 desirably contains a thermal conductor (e.g. a metal) so that the thermal coupling is very strong.

Alternatively, the temperature sensor 130 can optionally be constructed integrally into the transducer 160. In either case, it is desirable that the sensor 130 be separated from the medium 146 by a separation 136 large enough that localized, medium-induced variations in transducer temperature will be attenuated by 50% or more, as sensed by temperature sensor 130.

Printed circuit board assembly (PCBA) 167 includes cache 115, clock/counter 140, and two integrated circuits (channel IC 120 and controller IC 150). Several signal lines are provided so that controller IC 150 can request and receive data from fault detector 122 (of channel IC 120) or from temperature sensor 130. Controller IC 150 contains several registers with values 151,152,153 that control the operation of the transducer 160 and of the channel 110. As is conventional in the art, each parameter control value is encoded in a binary form that can only assume a finite number of values. For example, value 151 is an 8-bit code that corresponds to a predetermined level of bias current. Bias current is important for magneto-resistive heads common in disc drives, and typically takes values between 2and 20 milliamperes.

Value 152 is a lower-resolution code (primarily for simplicity) indicative of a write current (typically 10 to 100 milliamperes). The register values shown also include a write precompensation value 153, an off-track threshold value 154, and a nonlinearity correction value 155 as are known in the art. In general, the types of parameters selected for thermal calibration will depend on the type of transducer 160 used. Because some channel operating parameters are highly sensitive to transducer temperature variation and are controllable, it is important that at least some of them are updated when the transducer temperature changes. In a preferred embodiment, only 1 to 5 "most sensitive" operating parameter values are recalibrated in response to a fault detected.

When the temperature of transducer 160 changes, controller IC 150 must sense the change relatively soon so that the time during which the data path 110 is not operating well is minimized. As transducer 160 changes temperature, the performance of data path 110 declines. This causes fault detector 122 to send a fault condition signal to controller IC 167, which responds by recalibrating some of the registers 151,152,153 accessible to controller circuit 150. Note that register values 151,152,153 are desirably accessible so that they can be recalibrated even if they reside in the channel circuit 120.

Fault detector 122 is configured to transmit a fault indication when any of several simple criteria in the data path 110 are met. For example, fault detector 122 is optionally configured to indicate a fault condition (a) whenever 1000 consecutive blocks each have at least one erroneous bit, (b) whenever a gain control circuit in a block of the data path indicates a gain change larger than 50% in one gain adjustment cycle, or (c) whenever a block transmission is retried 20 times. Note that each criterion of these three included an "problem indicator" value and at least one corresponding quantitative "threshold." A "problem indicator" is desirably selected for convenience, using problem-indicative signals or values already existing in the error correction subsystem (not specifically shown). Corresponding thresholds are desirably selected so that "fault condition" indicators will usually occur less often than once per hour in normal operation at a stable temperature. Because error correction requires more complex fault detection criteria than is required for present purposes, such thresholds are easy to guess and to verify for many readily-obtained problem indicators. In some disc drive designs, a suitable "fault condition" value or signal is already available, thus allowing fault detector 122 to be implemented merely by extending the signal line, and without adding any components.

Figure 2:
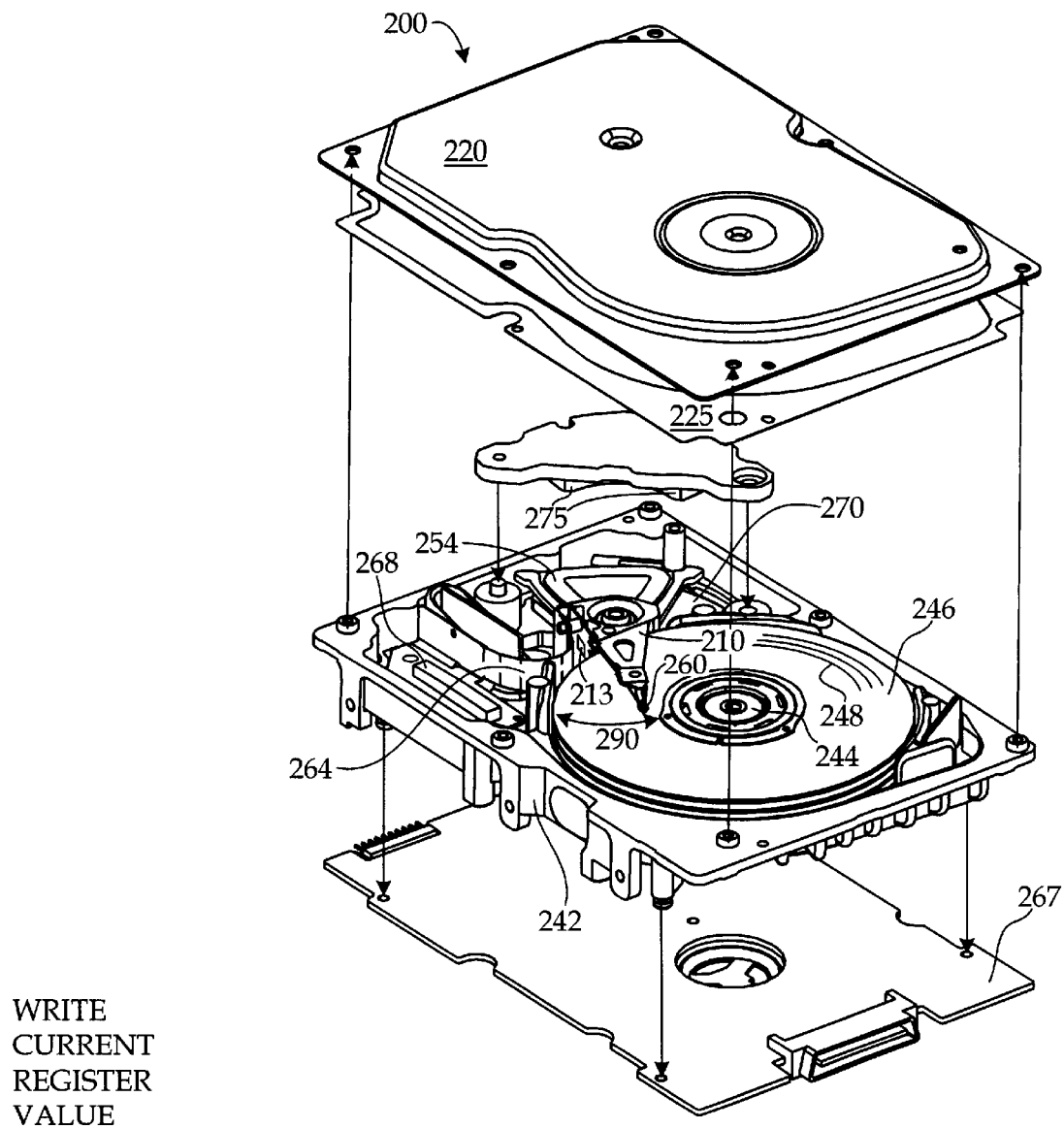
FIG. 2 shows an oblique, exploded view of a disc drive implementing the present invention.

FIG. 2 shows an oblique, exploded view of a disc drive 200 implementing the present invention. Disc drive 200 includes a base member 242 to which all other components are directly or indirectly mounted and a top cover 220 which, together with the base member 242, forms a disc drive housing which encloses delicate internal components and isolates these components from external contaminants.

The disc drive includes a plurality of discs 246 which are mounted for rotation on a spindle motor (not shown). The discs 246 include on their surfaces a plurality of circular, concentric data tracks 248 on which data are recorded via an array of vertically aligned heads (one of which is shown at 260). Heads 260 are supported by head suspension tabs, which are attached to arm portions of actuator 210. Actuator 120 is mounted for rotation about a pivot shaft 132. Power to rotate the actuator 210 is provided by a voice coil motor (VCM). The VCM consists of a coil 254 which is supported by actuator 210 within the magnetic field of an array of permanent magnets 275 fixedly supported by the base member 242, all in a manner well known in the disc drive industry. A controller board 267 contains most of the electronic circuitry controls the operation of the disc drive 200. Conventionally, this includes data signals to and from the heads 260 via interface block 268, flexible printed circuit cable (PCC) 264, and preamplifier chip 213.

Like the system of FIG. 1, disc drive 200 of FIG. 2 includes a data path with circuitry both on and off the primary controller board 267. Preamp chip 213 includes several registers that are desirably updated based on a temperature reading. Unfortunately, this may require more sophisticated computation than is practical for implementation in a preamp chip. To minimize the demands upon a processor tasked with updating, disc drive 200 performs such updating only during an initialization routine and when a fault detector (like item 122 of FIG. 1) indicates a fault condition in the data path. This is particularly advantageous when disc drive 200 is to be used in a server of a network. Servers have very high performance demands and very stable temperatures in their normal application.

Figure 3:
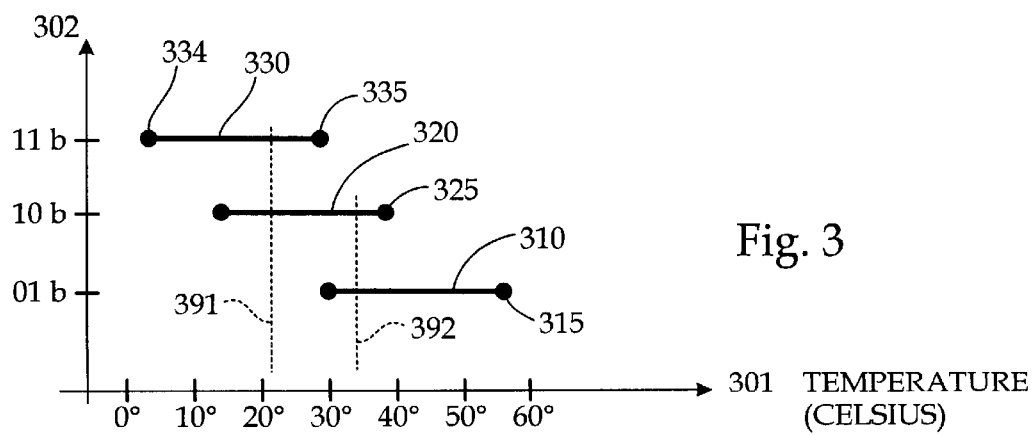
FIG. 3 plots the allowed values of a binary register (as an example of an operating parameter) against temperature.

FIG. 3 plots the allowed values 302 of a binary register against temperature 301. The binary register is one of the registers resident in preamp chip 213 of FIG. 2. Each of the allowed values corresponds to a respective bias current value between 2 and 20 milliamps. Bias current is a parameter relating to reading data. If the register value is 11b, FIG. 3 indicates that the read data channel will have a range 330 of optimal performance extending between 14° C. (range minimum 334) and 38° C. (range maximum 335).

The calibration of disc drive 200 will now be explained with reference to temperature thresholds 391,392. Thresholds 391,392 determine which write current register value 302 is most appropriate for the head's current temperature 301. When disc drive 200 is powered on, thermal calibration is performed at a time when head 260 is at 28° C. Because this is below the lowest threshold of 31° C., the register value is set to 11 binary. After a short time head 260 warms up past 40° C., which is above the optimal performance range maximum 335. A degradation in the performance of the read channel is detected by a fault detector on controller board 267, triggering a calibration routine.

The calibration routine begins with receiving an updated temperature measurement, which indicates that the head temperature is approximately 41° C. The calibration routine decides which of the allowed values 302 to assign based on the measured temperature in relation to the thresholds 391, 392. Because 41° C. is between the lower threshold 391 and the upper threshold 392, the write current register receives a value of 10 binary. This causes a lesser amount of write current through the transducer head 260 when writing. For a measured temperature above 44° C. (threshold 392), the calibration routine will cause an even lower write current level to be used (corresponding to a register value 302 of 01 binary).

Note that if the temperature ranges 310,320,330 of optimal performance were vertically aligned for a given register, thermal calibration of that register would be unnecessary. Accordingly, devices of the present invention desirably perform temperature calibration only for parameter values 302 having a significant effect on thermal ranges 310,320, 330 of optimal performance. By a "significant" effect, it is meant that the highest and lowest thermal ranges 310,330 are offset by at least 10° C. In the present case, the maximum 315 of range 310 is 68° C. and the maximum 335 of range 330 is 38° C. These differ by more than 20° C., so this parameter has a very significant effect on the thermal range of optimal performance.

FIG. 4 plots the allowed values 402 of a binary register against temperature 401. The binary register is one of the registers resident in preamp chip 213 of FIG. 2, one that pertains to the data channel operating in a read mode. Each of the allowed values corresponds to a respective nonlinearity correction mode numbers. There are six allowed values: 010b, 011b, 100b, 101b, 110b and 111b. Note that the "X" indicates that the third bit has is a "don't care" bit, indicating that it has no significant effect on the thermal ranges of operability 410,420,430. Thus, calibration/mode selection may leave the third bit unchanged.

Suppose that the increments of temperature 401 shown on FIG. 4 are at least about 5° C., so that the nonlinearity correction (mode number) register value has a significant effect on temperature. In that case, temperature calibration is desirably performed on register value 402. The thermal calibration is performed similar to that of FIG. 3. If a temperature reading is below threshold 491, the thermal calibration routine will set the upper two bits of value 402 to "10". If a temperature reading is above threshold 492, the upper two bits are set to "01". If a temperature reading is between the thresholds 491,492, the upper two bits are set to "11".

FIG. 5 depicts a calibration method 500 of the present invention comprising steps 505 through 565. The present invention is most useful for heavily utilized processors. In a disc drive, large numbers of time-critical positioning computations must be performed 515 for high performance track following. A processor must occasionally suspend this processing to determine whether a data path fault condition has been detected 520, and if so then must determine how recent the last thermal calibration update was 525. If it was sufficiently recent (e.g. less than about 10–1000 seconds ago), a new temperature measurement is obtained 540. If the measurement has changed, at least one channel operating parameter is updated 550. It will be understood that this method 500 is performed iteratively, so that the processor quickly returns to positioning computations 515 following the parameter update step 565.

FIG. 6 depicts a read error recovery table known in the disc drive industry. This table is described more fully in U.S. Pat. No. 5,721,816 entitled "ADAPTIVE RECOVERY OF READ AND WRITE ERRORS IN A DISC DRIVE" issued Feb. 24, 1998 to Kusbel et al. and commonly assigned with the present invention. The table describes a series of corrective operations optimally sorted to minimize the time required to recover a data sector that cannot be read successfully because the read channel is suboptimally configured. The Kusbel et al. patent teaches how to reorder such a table so that more successful operations are advanced in the table so that they occur earlier.

FIG. 7 depicts a method 700 of the present invention for read error recovery comprising steps 705–770 in an optimal order. The method is begun 705 in response to a failure to read a data block. The actuator is moved away from the target data block and returned, and then the data block is reread 710. If the reread is successful 720, the method 700 ends. Otherwise, the error correction code (ECC) level is changed, and the data block is reread again 730. If the reread is successful 740, the method 700 ends. Otherwise, the temperature sensor's output value is latched 745. Read channel parameters are updated 750 by methods similar to those described above in conjunction with FIG. 1. Next, the block is reread again 760. Note that mechanical manipuation operations such as "off track center" and "wiggle retry" are generally more time-consuming than electrical manipulation operations. For this reason, additional corrective activity 770 desirably includes mechanical manipulation.

Characterized more particularly, a first contemplated embodiment of the present invention combines all of the features disclosed in conjunction with FIGS. 1&2. A disc drive 200 includes several rotatable data storage discs 246 each having top and bottom surfaces. A transducer head 160,260 is positioned for interacting with the top surface of one disc 246. The head 260 has several controllable operating parameter values including a bias current value 151, a write current value 152, a write precompensation value 153, an off-track threshold value 154, and a nonlinearity correction value 155. Each of these operating parameter values 151,152,153 has a corresponding binary representation suitable for storage in a register of a controller circuit 150. Each binary representation has a range of allowed values 302 (exemplified as 01b, 10b, and 11b in FIG. 3).

This first embodiment also includes a read data path including the transducer head 160,260. The read data path 110 has a thermal range 330 that will shift by at least 10° C. (e.g. to range 310, which is optimal for higher temperatures) in response to the bias current value traversing the range corresponding to the bias current value. Calibrated values of bias current, write current, and nonlinearity correction are each highly temperature sensitive—i.e., able to shift the data path's thermal range of optimal performance by at least 10° C. in response to changes in any one of these parameters.

The data path 110 is characterized as "write data path" or a "read data path," depending on whether the disc drive 200 is writing or reading. A monitoring circuit 122 monitors the data path, and is configured to generate a read fault indication when a series of blocks of data in the read data path each contain more than a permissible number of errors. The temperature sensor 130 is preferably provided on the preamplifier chip 213 or on the data head 260. In either case, the temperature sensor 130 is separated from the transducer 160 by a gap 135 small enough so that the temperature sensor 130 can adequately measure the temperature of the transducer head 160. A control circuit 150 is coupled to the temperature sensor 130 and to the monitoring circuit 122.

The control circuit 150 is triggered periodically by clock counter 140 and whenever a fault indication is received from the monitoring circuit 122.

In a preferred embodiment, the controller circuit disregards fault indications within about 1–60 seconds after updating the values 151,152,153. Also, the controller circuit includes a buffer 159 that continuously receives an analog signal from temperature sensor 130, the analog signal being sampled, held, and converted to a digital value as a step of a calibration routine. The calibration routine desirably derives updated operating parameter values 151,152,153 based upon additional parameters such as gain values from an automatic gain control circuit (in addition to the temperature reading in buffer 159).

Alternatively characterized, a second contemplated embodiment of the present invention is a data handling system 100 with a data path 110 with a thermal range of optimal performance 310,320,330,410,420,430. At least one operating parameter value 302,402 substantially affects the thermal range of optimal performance (i.e., enough so that the parameter can shift an endpoint of the range by at least 10° C.). The second embodiment further includes a temperature sensor 130 constructed and arranged to measure a temperature of a portion of the data path 110. A control circuit 150 is operatively coupled to the data path 110 and to the temperature sensor 130. The control circuit 150 is configured to update the operating parameter value 302,402 in response to an indication of a fault (e.g. via fault detector 122) in the data path.

The data handling system of this second embodiment is optionally a magnetic disc drive 200 with a transducer head 260 that floats adjacent to a rotatable disc 246. The data path is a "read path" or a "write path," depending on whether data flows from or toward the disc. In either case, the data path will operate optimally only when the transducer head 260 is within the thermal range 330 for which it was calibrated. Many of the calibration parameters significantly affect the path's thermal range of optimal performance. In this second embodiment, it so happens that such parameters include a bias current register value, a write current register value 302, or a nonlinearity correction register value 402. In some cases, also, "the thermal range of optimal performance" 330 may be necessary for the disc drive 200 to operate reliably.

The control circuit of this second embodiment optionally includes a monitoring circuit 122 configured to indicate fault condition (i.e. transmit a code or signal indicative of a fault) when a predetermined number of consecutive data blocks each contain more than a permissible number of errors. The selection of suitable limits is within the skill of an ordinary practitioner with the benefit of teachings herein.

This second embodiment preferably includes temperature sensor 130 either on the transducer head 160 (for more accuracy) or on the preamp chip 213 (for lower cost). The construction and arrangement of suitable locations to allow the sensor 130 to measure the temperature of transducer head 160 cost-effectively is a matter of design choice for an ordinary practitioner with the benefit of teachings herein.

This second embodiment optionally includes the ability to update channel operating parameters in rotation, so that a temperature sensor reading need not perform the entire block of register updates each time a temperature measurement becomes available. Optionally, a clock/counter 140 is provided so that partial or total update computation routines are executed periodically based on the most recent temperature sensor measurement available. In this way, the clock/counter 140 can trigger a periodic update of the first operating parameter value based on an aperiodic measurement from the temperature sensor 130. Note that the temperature sensor 130 itself need not be calibrated to an absolute temperature, but can instead provide composite measurements that depend on manufacturing variation as well as temperature.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to disc drives, it will be appreciated by those skilled in the art that the teachings of the present invention can be applied to other data handling systems such as wireless communication without departing from the scope and spirit of the present invention.

What is claimed is:

1. A thermally compensated data handling system comprising:
    a data path having a thermal range of optimal performance and a first operating parameter value that substantially affects the thermal range of optimal performance;
    a temperature sensor constructed and arranged to measure a temperature of a portion of the data path; and
    a control circuit coupled to the data path and to the temperature sensor, the control circuit configured to update the first operating parameter value in response to an indication of a fault in the data path.

2. The data handling system of claim 1 in which the control circuit includes a buffer configured to receive an analog temperature signal continuously, the buffer latching the temperature signal in response to the indication of fault in the data path.

3. The data handling system of claim 1 in which the data path portion is a transducer head, in which the data path operates as a read data path having a thermal range endpoint that will shift by at least 10° C. in response to the first operating parameter value traversing its range.

4. The data handling system of claim 1 in which the data path portion is a transducer head, in which the data path operates as a read data path having a thermal range that will shift by at least 10° C. in response to the first operating parameter value traversing its range, the first operating parameter value being a bias current value of the transducer head.

5. The data handling system of claim 1 in which the data path portion is a transducer head, in which the data path operates as a read data path having a thermal range endpoint that will shift by at least 10° C. in response to the first operating parameter value traversing its range, the first operating parameter value being a nonlinearity correction value.

6. The data handling system of claim 1 in which the data path portion is a transducer head, in which the data path operates as a write data path having a thermal range endpoint that will shift by at least 10° C. in response to the first operating parameter value traversing its range.

7. The data handling system of claim 1 in which the data path portion is a transducer head, in which the data path operates as a write data path having a thermal range that will shift by at least 10° C. in response to the first operating parameter value traversing its range, the first operating parameter value being a write precompensation value.

8. The data handling system of claim 1 in which the data path is operable only when the data path portion has a temperature within the data path's thermal range of optimal performance.

9. The data handling system of claim 1 in which the control circuit includes a monitoring circuit that generates the indication when a predetermined number of consecutive data blocks each contain more than a permissible number of errors.

10. The data handling system of claim 1 in which the data path transmits blocks of data between a rotating storage disc and a memory cache, and in which the data path passes through an integrated circuit containing the temperature sensor.

11. The data handling system of claim 1 in which the data path transmits blocks of data between a rotating storage disc and a memory cache, and in which the data path passes through a transducer head containing the temperature sensor.

12. The data handling system of claim 1 in which the control circuit further includes a timing circuit able to trigger a periodic update of the first operating parameter value derived from a measurement from the temperature sensor.

13. The data handling system of claim 1 in which the control circuit is further configured to update the first operating parameter value based upon the value of a temperature measurement from the temperature sensor.

14. An error recovery method for the data handling system of claim 1 comprising steps of:
   (a) reading a data block via the data path;
   (b) updating the first operating parameter value based upon a reading from the temperature sensor if a first error is detected in the data block;
   (c) re-reading the data block via the data path;
   (d) mechanically adjusting the data path, if a second error is detected in the data block after updating step (b) and re-reading step (c);
   (e) re-reading the data block via the data path.

15. An error recovery method for a data handling system comprising steps of:
   (a) reading a data block via a data path;
   (b) electronically adjusting the data path, if a first error is detected in the data block;
   (c) re-reading the data block via the data path; and
   (d) updating the first operating parameter value based upon a reading from the temperature sensor if and only if a second error is detected in the data block.

16. The error recovery method of claim 15, further comprising steps of:
   (e) re-reading the data block via the data path;
   (f) mechanically adjusting the data path, if a third error is detected in the data block; and
   (g) re-reading the data block via the data path.

17. A thermally compensated data handling system comprising:
   a primary data path having a thermal range of optimal performance and a first operating parameter value that substantially affects the thermal range of optimal performance; and
   means for adjusting the first operating parameter value in response to an indication of a fault in the primary data path.

18. The data handling system of claim 17, the system including at least one rotatable data storage disc having first and second data surfaces, the system further including a transducer head positioned for interacting with the first data surface, the primary data path including a read data path traversing the transducer head, the first operating parameter being a bias current value of the read data path, the read data path further including a second operating parameter being a nonlinearity correction value, the operating parameter values each having a corresponding range of allowed values, the read data path having a thermal range that will shift by at least 10° C. in response to the bias current value traversing the range corresponding to the bias current value, the thermal range also shifting by at least 10° C. in response to the nonlinearity correction value traversing the range corresponding to the nonlinearity correction value, the read data path being operable only when the transducer head has a head temperature within the read data path's thermal range, the data handling system comprising a write data path of the primary data path traversing the transducer head having several controllable operating parameter values including a write precompensation value and a write current value, the write data path having a thermal range that will shift by at least 10° C. in response to the write precompensation value traversing the range corresponding to the write precompensation value, the write data path being operable only when the transducer head has a head temperature within the write data path's thermal range, in which the means for adjusting is:
   a monitoring circuit coupled to the read data path and the write data path, configured to generate a read fault indication when a series of blocks of data in the read data path each contain more than a permissible number of errors;
   a temperature sensor positioned near enough to the transducer head so that the temperature sensor can adequately measure the temperature of the transducer head; and
   a control circuit coupled to the temperature sensor and to the monitoring circuit, the control circuit being triggered periodically and whenever a fault indication is received, the control circuit then updating the operating parameter values of the read data path and the write data path based on a measurement from the temperature sensor so as to compensate for a temperature shift since a previous calibration.

\* \* \* \* \*